United States Patent [19]

Green

[11] Patent Number: 5,490,753
[45] Date of Patent: Feb. 13, 1996

[54] ROLL ON ROLL OFF DEVICE

[76] Inventor: Richard Green, P.O. Box 249, Titus, Ala. 36080

[21] Appl. No.: 1,960

[22] Filed: Jan. 8, 1993

[51] Int. Cl.$^6$ .................... B60P 3/42; B60P 1/54
[52] U.S. Cl. .................. 414/498; 414/401; 414/543
[58] Field of Search .................. 414/498, 401, 414/522, 541, 543; 296/10, 35.3, 164; 220/1.5

[56]  References Cited

U.S. PATENT DOCUMENTS

| | | | |
|---|---|---|---|
| 1,030,320 | 6/1912 | Morgan . | |
| 1,996,523 | 4/1935 | Pfeifer et al. | 414/401 |
| 2,379,094 | 6/1945 | Maxon | 214/38 |
| 2,523,749 | 9/1950 | Wilson | 414/401 X |
| 2,543,295 | 2/1951 | McGregor et al. | 214/38 |
| 2,650,731 | 9/1953 | Adler | 414/498 |
| 2,849,129 | 8/1958 | Likens | 214/38 |
| 3,471,045 | 10/1969 | Panciocco | 214/83.24 |
| 3,722,721 | 3/1973 | Bennett | 414/498 |
| 3,854,594 | 12/1974 | Brookes | 414/543 X |
| 3,901,304 | 8/1975 | Jacobsen | 414/498 X |
| 3,910,624 | 10/1975 | Becker | 296/35 R |
| 3,915,476 | 10/1975 | Burkle | 280/422 |
| 3,931,895 | 1/1976 | Grimaldo | 214/1 A |
| 3,958,707 | 5/1976 | Deppe | 214/390 |
| 3,987,919 | 10/1976 | Weeks et al. | 214/506 |
| 3,995,890 | 12/1976 | Fletcher | 296/10 |
| 4,113,293 | 9/1978 | Paquette | 292/341.18 |
| 4,114,854 | 9/1978 | Clark | 254/122 |
| 4,216,986 | 8/1980 | McNinch et al. | 292/341.17 |
| 4,268,083 | 5/1981 | Carpenter | 296/10 |
| 4,269,443 | 5/1981 | Farmer | 296/1 S |
| 4,305,695 | 12/1981 | Zachrich | 414/522 |
| 4,367,906 | 1/1983 | Rock | 312/330 R |
| 4,375,306 | 3/1983 | Linder | 312/250 |
| 4,489,977 | 12/1984 | Earing | 296/35.3 |
| 4,557,531 | 12/1985 | Rock et al. | 308/3.8 |
| 4,681,360 | 7/1987 | Peters et al. | 296/37.6 |
| 4,685,857 | 8/1987 | Goeser et al. | 414/522 |
| 4,697,974 | 10/1987 | Eltoukhy | 414/401 X |
| 4,810,158 | 3/1989 | Bitzer | 414/498 |
| 4,824,158 | 4/1989 | Peters et al. | 296/37.6 |
| 4,930,799 | 6/1990 | Pihlstrom et al. | 280/400 |
| 4,979,865 | 12/1990 | Strickland | 296/10 X |
| 5,224,812 | 7/1993 | Oslin et al. | 414/498 X |
| 5,243,901 | 9/1993 | Green | 100/7 |

*Primary Examiner*—Michael S. Huppert
*Assistant Examiner*—Stephen Gordon
*Attorney, Agent, or Firm*—Willian Brinks Hofer Gilson & Lione

[57] ABSTRACT

A roll on roll off receptacle handling system, that can load and unload a receptacle, storing the receptacle and transporting the receptacle. The system includes a storage platform that the receptacle can be rolled on to and off from. The system also includes a transport device that the receptacle can be rolled on to or off from. The transport device can transport the receptacle to another location where it can be rolled off to another platform. The system also includes an overhead boom, mounted on the transport device, that functions to load and unload the receptacle.

11 Claims, 5 Drawing Sheets

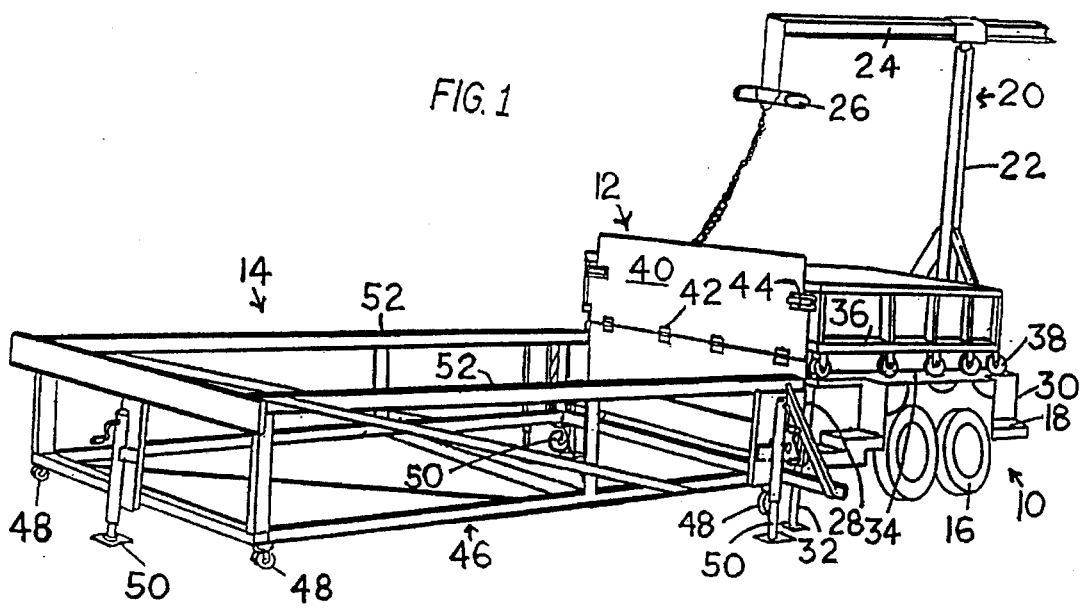
FIG. 1
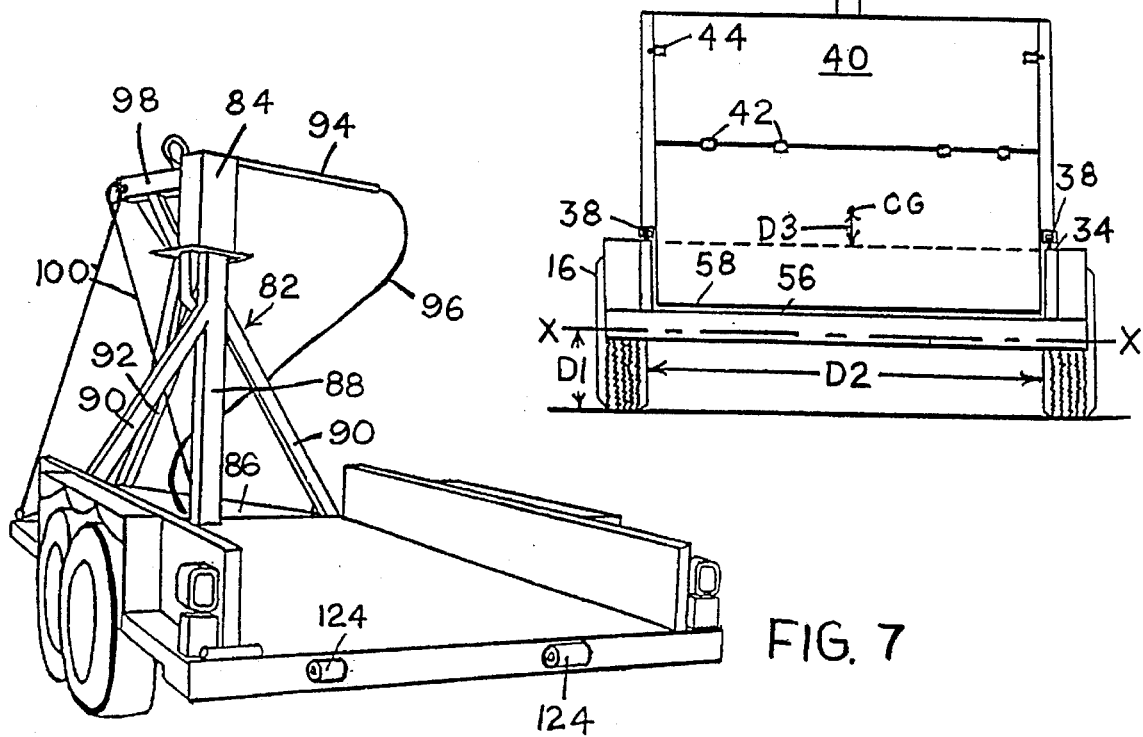
FIG. 2
FIG. 7

ROLL ON ROLL OFF DEVICE

BACKGROUND OF THE INVENTION

This invention relates to a system for managing a receptacle, including loading and unloading the receptacle, storing the receptacle and transporting the receptacle. The system includes a storage platform that the receptacle can be rolled on to and off from. The system also includes a transport device that the receptacle can be rolled on to or off from. The transport device can transport the receptacle to another location where it can be discharged or rolled off to another storage platform. The system can include, but does not require, an overhead boom mounted on the transport device that functions to load and unload the receptacle.

Systems and devices for storing and transporting modular receptacles are known in which a receptacle is supported above the ground and a transporting vehicle or truck is driven under the receptacle so that the receptacle can be transferred to the vehicle or truck. Some such systems, such as that shown in U.S. Pat. No. 2,379,094 include an elevating mechanism to effect the transfer, while others assume that the receptacle is supported at the ideal location to facilitate transfer to the vehicle or truck. In these prior art devices the receptacle's flat bottom surface rests on a corresponding flat supporting surface of the vehicle.

The original concept for this roll on roll off system was developed as a system for maneuvering, storing and transporting large banded bundles of fire wood. The machines and methods for forming these fire wood bundles is fully disclosed and claimed in U.S. Pat. application, No. 5,243,901 which patent is hereby included by reference as a part of this application. The original concept, has a much broader and comprehensive application and use than that for which it was originally developed.

The roll on roll off concept can be applied to carriers such as pick up trucks, small trailers, large trailers pulled by highway tractors, flat beds or vans, small and large conventional vans, trains, ships, barges and airplanes. The application of the roll on roll off concept to such carriers does not prevent the carrier from being applied to its normal use.

The concept can be applied to the transportation of any commodity, including items hauled in military operations. The concept provides the means by which transportation vehicles such as automobiles may be designed to be easily convertible from the passenger mode to an open roll on roll off bed, roll on roll off van or station wagon.

When applying this concept to people transporters, a discharge compartment could be pre-loaded and rolled off at the passenger's destination or at a transfer point to another carrier vehicle and a pre-loaded new passenger compartment could be rolled on. Such a system would minimize the lay over time at stops and reduce the total time from the origin to the final destination.

The roll on roll off system disclosed herein can of course be used for the purpose for which it was originally conceived, managing large banded bundles of fire wood. However since the receptacle can take many different forms and shapes the system has limitless other uses. For example the receptacle could be a fuel or water tank, a portable office, a shipping container, a portable tool shed or a camper. When used as a shipping container, trailers for highway tractor trailer trucks could be fitted with support surfaces that will permit the receptacles to be rolled in and rolled out of the trailers. The system is ideal for suppliers whose customers are using a just in time supply system. The daily order can be packaged into a roll on roll off receptacle, the receptacle rolled onto the suppliers vehicle, rolled off at the customers facility and the previously delivered empty receptacle rolled on the vehicle.

The roll on roll off system requires such a low input of power that an individual can manually roll a receptacle from the vehicle to a platform or reverse.

An embodiment of this invention has been enhanced by affixing a boom mechanism as an integral part of the system. By including a boom mechanism as a part of the system the receptacle can be loaded or unloaded at remote facilities where other power equipment is not available. Also receptacles can be of a size that the overhead crane or boom can pick up and unload or load entire receptacles at remote sites where there is no support platform to receive the receptacle. This is a significant improvement over prior art systems which are limited to loading and unloading the entire receptacle at the originating docking facility or a destination docking facility where storage platforms designed to receive the receptacle are available. The prior art devices do not contemplate loading and unloading articles from the receptacle that could not be handled manually. Not only can the boom mechanism load and unload the receptacles, it can be used to pick up entire receptacles and load them to or unload them from the wheeled vehicle. In addition the boom mechanism can be used to convert the receptacle into a dump bed by providing a pivotal connection between the receptacle and the transport vehicle. These features require that the horizontal flat support surfaces on the wheeled vehicle that support the wheels of the receptacle be unencumbered from above. Equivalent functions and advantages could be accomplished by the use of manual jacks or integral electric or hydraulic lifting devices.

Another application of this concept is the use of disposable roll on roll off containers. For example, a disposable container could be rolled off its carrier while the carrier remained in motion in the deployment of men and or materials in a battle field environment.

This inventive concept has significant advantages when applied to the local delivery area of commerce such as in the food and beverage businesses. Pre-loaded or pre-sorted containers can be quickly and efficiency rolled onto the transport vehicle rather than incapacitating the high capital investment vehicle while it is being loaded. The pre-loaded containers can then be quickly and efficiently unloaded, which in addition to the economical advantages will contribute greatly to the relief of traffic congestions.

An embodiment of the system could have the wheels on one side of the receptacle at a higher or lower elevation than the wheels on the other side, to accommodate loading or unloading from a side of the receptacle.

Another embodiment of the system could have the wheels at one end of the receptacle elevated relative to the wheels at the other end such that when the receptacle is released it unloads itself by rolling down a ramp.

It is a primary objective of this invention to provide a roll on roll off device that can be used to manually load and unload a receptacle containing cargo to and from a receptacle platform such that the receptacle will be supported in a stable fashion and will be supported on the transport vehicle in a manner that it will not have a tendency to tip when the vehicle turns a sharp corner.

It is another object of the present invention to provide a roll on roll off system that includes a hoist that is integral with the device that will enable the receptacle to be loaded or unloaded at remote locations.

It is another objective of the present invention to provide a roll on roll off device that can be used to transport a plurality of large heavy bundles, such as bales of fire wood, and unload the heavy bundles at their destination in undamaged condition.

SUMMARY OF THE INVENTION

To achieve these and other objectives, the present invention provides a new and unique roll on roll off system that can be used to load and unload receptacles on to a transport vehicle, store the receptacles such that they can easily reloaded to the transport vehicle, and load and unload articles from the receptacles.

The center of gravity of a loaded receptacle will always be above its bottom surface. The higher the center of gravity relative to the bottom surface, provided the receptacle is supported on its bottom surface, the more vulnerable the receptacle is to tipping over during transport. The receptacles of this invention are not supported on their bottom surface, rather they are supported at a level above their bottom surfaces and thus the center of gravity of the loaded receptacles are relatively close to the horizontal plane on which they are supported and the overall stability of the system is thereby improved.

The system can include an overhead boom that permits dumping of the receptacle or loading and unloading of receptacles to the transport vehicle.

These and other objects and advantages of the present invention will no doubt become apparent to those skilled in the art after having read the following detailed description of the preferred embodiment which are contained in and illustrated by the various drawing figures.

BRIEF DESCRIPTION OF DRAWING

FIG. 1 is a perspective view of the preferred embodiment of the roll on roll off device in which a roll on roll off receptacle is at rest on a wheeled vehicle which is parked adjacent a receptacle storage platform.

FIG. 2 is rear view of the wheeled vehicle having a receptacle storage platform mounted thereon.

FIG. 7 is a perspective view of an embodiment of a wheeled vehicle in which the manually operated overhead swinging boom has been replaced by an electric hydraulic boom.

DETAILED DESCRIPTION OF THE PREFERRED EMBODIMENT

Figure 3:
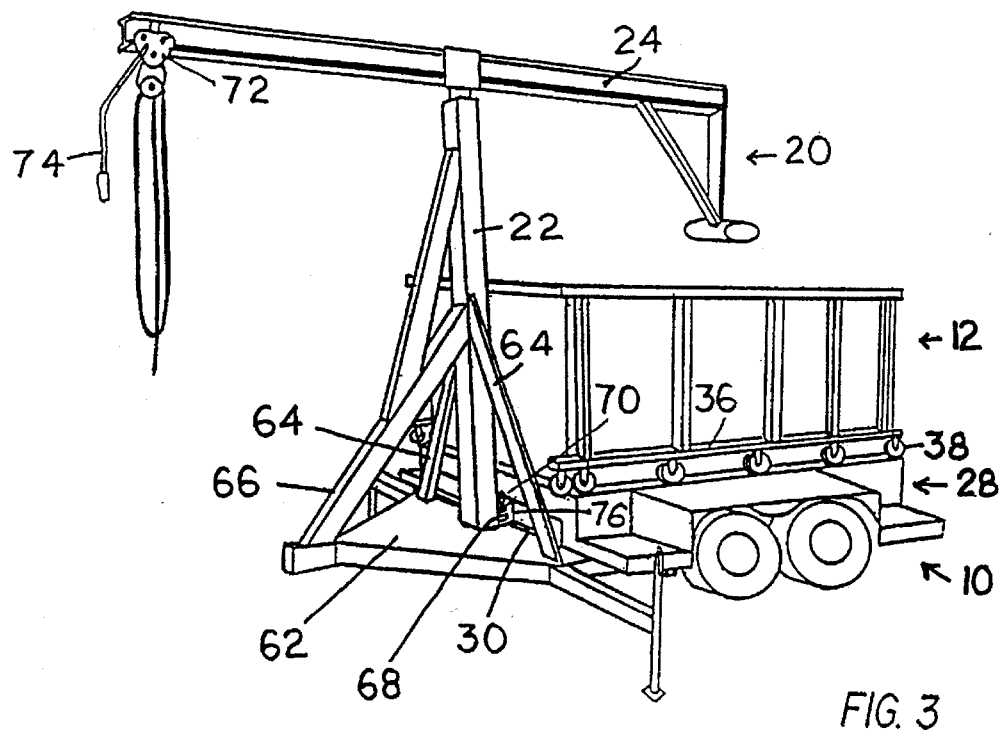
FIG. 3 is a perspective view of the wheeled vehicle with a roll on roll off receptacle supported thereon.

FIG. 1 discloses the roll on roll off receptacle 12 at rest on a wheeled vehicle 10 with a receptacle storage platform 14 aligned such that the pair of elongated flat support surfaces 34 of the wheeled device or vehicle 10 are aligned with the pair of elongated flat support surfaces 52 of the receptacle storage platform The wheeled device or vehicle 10 is built around a frame 18 to which are mounted the ground engaging wheels 16 and the other components. The overhead swinging boom 20 is secured to the frame 18 by support members that will be discussed in more detail in the discussion of FIG. 3. The overhead swinging boom 20 includes a vertical pedestal 22 that supports a horizontal beam 24 at its upper end for swinging motion about a vertical axis. A hoist trolley 72, not seen in this view, is carried by the horizontal beam 24. The opposed end of the horizontal beam 24 is provided with a counterweight 26 which facilitates the swinging motion of the overhead swinging boom 20. The overhead swinging boom 20 is anchored at one longitudinal end of the wheeled device or vehicle 10 which shall be referred to as the closed end 30. The end of the wheeled device or vehicle 10 opposite to the closed end 30 shall be referred to as the open roll on roll off receiving end 28. The pair of elongated flat support surfaces 34 are supported by the frame 18 and are designed to support substantial weight since the entire weight of the roll on roll off receptacle 12 and its cargo are carried by these surfaces. A plurality of ground engaging jacking mechanism 32 are secured to the frame 18 and can function to stabilize the wheeled device or vehicle 10, for aligning the surfaces 34 and 52 or to relieve pressure on the ground engaging wheels 16 if the wheeled device or vehicle 10 is to be left stationary for a long time period. The roll on roll off receptacle 12 disclosed in this Figure is basically an open top box having a door 40 that is connected by set of hinges 42 and can be secured closed by latches 44. The roll on roll off receptacle 12 could take the form of numerous functional components such as a tool box, a portable office, a modular container or numerous devices. The roll on roll off receptacle 12 has on each longitudinal side a support beam 36 which is structurally supported by vertical beams. A set of aligned rollers 38 are supported by the support beams 36 and extend down from its bottom surface.

The receptacle storage platform 14 functions to support a roll on roll off receptacle 12 at the level relative to the ground that it is supported on the wheeled device or vehicle 10. The receptacle storage platform 14 is constructed of beams that form a frame 46. A plurality of ground engaging wheels 48 are secured to the corners of the frame 46 that enable a person to easily move the empty receptacle storage platform 14 around and with some effort move a receptacle storage platform 14 with a loaded roll on roll off receptacle 12 supported thereon. The receptacle storage platform 14 has three ground engaging jacking mechanisms 50 secured thereto that can be raised out of contact with the ground when the receptacle storage platform 14 is to be moved from one place to another and can be lowered into contact with the ground when it is desired to align the pair of elongated flat support surfaces 52 with the cooperating pair of elongated flat support surfaces 34 of the wheeled device or vehicle 10. The ground engaging jacking mechanism 50 would normally be lowered when the receptacle storage platform 14 is being used to store a loaded roll on roll off receptacle 12 for a long period.

FIG. 2 is a rear view of a wheeled device or vehicle 10 having a roll on roll off receptacle 12 mounted thereon. In this Figure the generally horizontal axis about which the ground engaging wheels 16 are mounted for rotation is illustrated and identified as X—X. The generally horizontal axis X—X is spaced above the ground line a distance represented by D1 and the distance between the inner surfaces of the ground engaging wheels 16 is represented by D2. In this Figure the horizontal bottom surface of the wheeled device or vehicle 10 is identified by reference number 56 and the horizontal bottom surface of the roll on roll off receptacle 12 is identified by 58. It should be noted that there is a clearance between horizontal bottom surfaces 56 and 58 which prevents frictional resistance between these surfaces when the roll on roll off receptacle 12 is rolled on and off. This clearance also allows sufficient air flow to dry up any moisture that has collected on surface 56 and thus prevent this surface from rusting. The pair of elongated flat support surfaces 34 of the wheeled device or vehicle 10 are shown, in this Figure, as having the set of aligned rollers 38 of the roll on roll off receptacle 12 resting thereon.

The pair of elongated flat support surfaces 34 overlay the upper surface of the ground engaging wheels 16 and is thus located above the horizontal axis X—X a distance that is greater than D1. Since the flat support surfaces 34 overlay the ground engaging wheels 16 the transverse distance between rollers 38 is greater than the distance D2. It is apparent that the greater this distance is the more stable the roll on roll off receptacle 12 becomes, especially when the wheeled vehicle is negotiating a sharp curve. As the wheeled device or vehicle 10 is being transported and particularly when it is manipulating a corner there will be a tendency for the roll on roll off receptacle 12 to tip upwardly about the set of aligned rollers 38, as an axis, that are on the inside radius of the turn. It should be noted that aligned rollers 38 are confined to the elongated flat support surfaces 34 by gravity alone and there is nothing restraining upwardly movement therefrom. The center of gravity of the roll on roll off receptacle 12 including its load has been arbitrarily located and is represented by the point identified as CG in FIG. 2. The CG is a distance D3 above the horizontal plane of the pair of elongated flat support surfaces 34. If the roll on roll off receptacle 12 were resting on the horizontal bottom surface 56 of the wheeled device or vehicle 10 rather than the pair of elongated flat support surfaces 34 than the distance between the center of gravity of the roll on roll off receptacle 12 and the horizontal plane of the supporting surface would be considerably greater than D3 and the tendency for the roll on roll off receptacle 12 to flip off of the wheeled device or vehicle 10 when making a sharp turn would be much greater. Thus by elevating the pair of elongated flat support surfaces 34 above the bottom surface of the roll on roll off receptacle 12, the stability of the system has been increased considerably.

FIG. 3 is a front side perspective view of the wheeled device or vehicle 10 having a roll on roll off receptacle 12 supported thereon that is isolated from the receptacle storage platform 14. In this view the entire horizontal beam 24 is shown which includes a hoist trolley 72 slidable mounted thereon. The hoist trolley 72 includes a handle 74 which can be used to slide the hoist trolley 72 along the horizontal beam 24 and to pivot the horizontal beam 24 about the vertical pedestal 22. This view further illustrates the pedestal platform 62 upon which the vertical pedestal 22 and its supports are mounted. A pair of transverse supports 64 extend from the vertical pedestal 22 to the pedestal platform 62 to provide transport support to the vertical pedestal 22. A fore and aft support 66, which includes a first beam that extends from the pedestal platform 62 to the vertical pedestal 22 and a second beam that extends from the first beam to the vertical pedestal 22, provides fore and aft support for the vertical pedestal 22. At the rear base of the vertical pedestal 22 there is an anchor device 68 that has a vertical opening formed therein. The anchor device 68 cooperates with an anchoring device 76 carried by the roll on roll off receptacle 12 which also has a vertical opening formed therein. The vertical openings in the anchor device 68 and anchoring device 76 are aligned and receive an anchoring pin 70 which functions to secure the roll on roll off receptacle 12 in place on the wheeled device or vehicle 10. It should be understood that although a single pair of cooperating anchoring devices 68 and 76 have been disclosed in some situations multiple pairs have been found to be advantageous.

With the roll on roll off receptacle 12 secured to the wheeled device or vehicle 10 the wheeled device or vehicle 10 can be hitched to a towing vehicle and transported from place to place. When it is desired to unload cargo contained in the roll on roll off receptacle 12 or to load cargo into the roll on roll off receptacle 12 the horizontal beam 24 is swung around by the handle 74 and the hoist trolley 72 manipulated such that the loading or unloading operation is accomplished.

Figure 4:
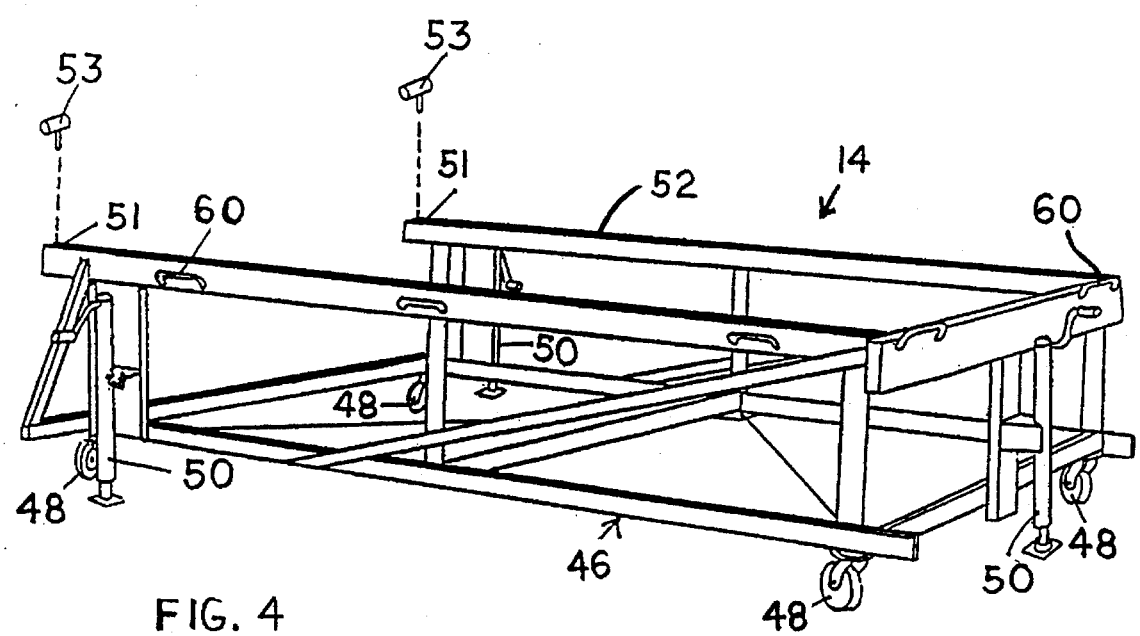
FIG. 4 is a perspective view of the isolated receptacle storage platform which clearly shows the ground engaging wheels and the jacking mechanisms.

FIG. 4 is a perspective view of the isolated receptacle storage platform 14 which clearly shows the ground engaging wheels 48 and the jacking mechanisms 50. A series of handles 60 are secured to frame 46 of the receptacle storage platform which can be used when the operator is manipulating the platform. It should be noted that there are two jacking mechanisms 50 at end of the receptacle storage platform 14 that receives the roll on roll off device 12. These jacking mechanisms 50 can be individually adjusted to accurately align the flat support surfaces 34 of the wheeled device or vehicle 10 with the cooperating flat support surfaces 52 of the receptacle storage platform 14. A single, centrally located jacking mechanism 50 is located at the opposed end of the receptacle storage platform 14. A vertical hole 51 is drilled in the free end of the each frame member that forms the pair of elongated flat support surfaces 52. A stop 53 can be inserted and removed from the vertical holes 51 after the roll on roll off receptacle has been properly located on the receptacle storage platform. The stop 53 functions as a safety device preventing the roll on roll off receptacle from rolling off the receptacle storage platform 14 in the event a ground engaging jacking mechanism 50 is inadvertently misadjusted or a wheel 48 collapses. It has been found that a stop 53 that is about one sixth the height of the aligned rollers 38 is an appropriate size. Similar stops can be applied at the other end of the receptacle storage platform 14.

Figure 5:
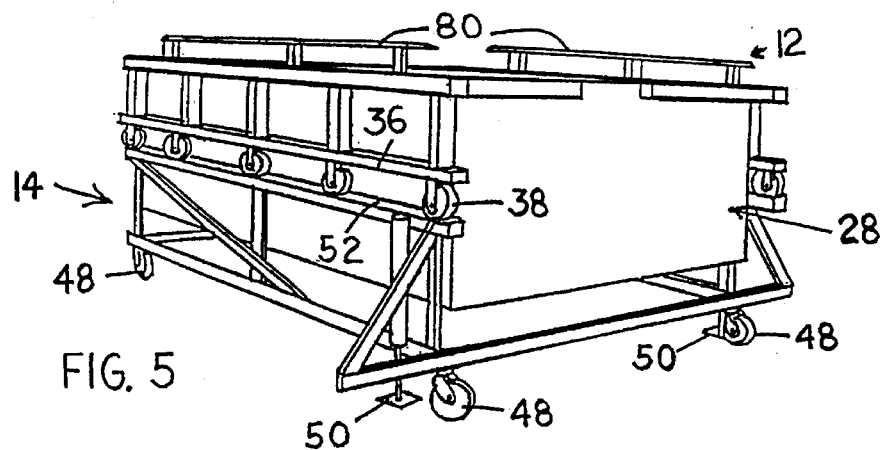
FIG. 5 is a perspective view of the receptacle storage platform seen from the open roll on roll off receiving end and having a single roll on roll off receptacle resting thereon.

FIG. 5 is a perspective view of the receptacle storage platform 14, seen from the open roll on roll off receiving end 28, with a roll on roll off receptacle 12 resting thereon. Also shown in this view are horizontal bars 80 along the upper longitudinal edges of the receptacle 12 that are used to wrap strapping around when it is desired to secure cargo in the receptacle. The horizontal bars 80 can also be grasped by an operator to manipulate the receptacle 12 when rolling it between the receptacle storage platform 14 and the wheeled device or vehicle 10.

As seen in FIG. 1 the receptacle storage platform 14 was located adjacent the wheeled device or vehicle 10 with a roll on roll off receptacle 12 resting thereon. The receptacle storage platform 14 can be easily maneuvered by one person when the ground engaging jacking mechanism 50 are raised and the receptacle storage platform 14 is supported on the ground by its wheels 48. The operator can use the handles 60 (see FIG. 4) to manipulate the receptacle storage platform 14 until its pair of elongated flat support surfaces 52 are close to alignment with the corresponding pair of elongated flat support surfaces 34 of the wheeled device or vehicle 10. When this is accomplished the ground engaging jacking mechanism 50 of the receptacle storage platform 14 are extended to raise the receptacle storage platform 14 such that it is no longer supported by its wheels 48. When the receptacle storage platform 14 is supported by the ground engaging jacking mechanism 50 it becomes stationary. The wheeled device or vehicle 10 also has ground engaging jacking mechanism 32 which can be adjusted to attain vertical alignment of the pair of elongated flat support surfaces 34 of the wheeled device or vehicle 10 with the pair of elongated flat support surfaces 52 of the receptacle storage platform 14. When the pair of elongated flat support surfaces 34 and pair of elongated flat support surfaces 52 have been aligned the roll on roll off receptacle 12 is rolled from the wheeled device or vehicle 10 to the receptacle storage platform 14. This transfer operation can easily be accomplished by one person, even if the roll on roll off receptacle 12 is heavily loaded. The operator can use the horizontal bars 80 in rolling the roll on roll off receptacle 12 onto the receptacle storage platform 14. The receptacle storage platform 14 can be used to store either full or empty roll on roll off receptacles 12 for an indefinite period. When it is desired to move the roll on roll off receptacle 12 the reverse of the above described process is performed to thus transfer the roll on roll off receptacle 12 back to the wheeled device or vehicle 10.

Figure 6:
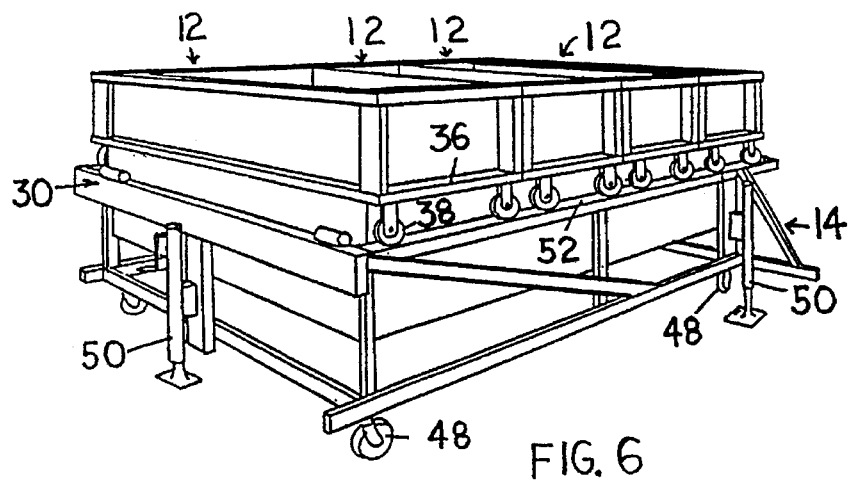
FIG. 6 is a perspective view of the receptacle storage platform seen from its closed end and having several roll on roll off receptacles resting thereon.

FIG. 6 is a view similar to FIG. 5, differing in that this view is from the opposite end and instead of a single large roll on roll off receptacle 12 there are four smaller receptacles 12. In FIG. 6 the closed end 30 of the receptacle storage platform 14 is seen rather than the open roll on roll off receiving end 28. In this view the centrally located ground engaging jacking mechanism 50 is clearly shown. The four independent roll on roll off receptacles are intended to demonstrate that multiple receptacles can be carried by a wheeled vehicle 10 or supported on a receptacle storage platform 14. It is of course necessary that the width of the receptacles be consistent so that the rollers 38 properly engage with the elongated flat support surfaces 34 and 52. Each of the receptacles 12 shown in FIG. 6 is designed to carry two half- cord banded bundles of fire wood. The size of the receptacles can of course be customized for the product that they are intended to handle.

Receptacles of the size shown in FIG. 6 can be fitted with channels on their bottoms to receive the prongs of a fork lift truck. The receptacles can then be picked up by the fork lift from the ground, a receptacle storage platform or a wheeled vehicle. This of course render the system much more versatile because when delivering a load of receptacles such as those shown in FIG. 6 to a destination they can be unloaded by a standard fork lift and the need for a special designed receptacle storage platform is not required.

FIG. 7 is a rear perspective view of an embodiment of the wheeled vehicle 10 having an electric hydraulic boom or powered boom mounted thereon. The boom support 82 is located at the forward end of the wheeled device or vehicle 10 and has at its base a support platform 86. Extending upwardly from the support platform 86 is a vertical pillar 88 which is braced by transverse diagonal supports 90 and a fore and aft support 92. The electric hydraulic boom or powered boom 84 is mounted on top of the hoist support 82 and is shown in this Figure in a stored or transport mode. A transversely extending control arm 94 extends to one side such that the control cord 96 is conveniently located for the operator. The boom arm 98 is of the type that can extend and retract and can also pivot about a horizontal axis. The electric hydraulic boom or powered boom 84 is a commercially available product and is not of its self a part of this invention. In FIG. 7 the free end of the boom arm 98 is shown secured to the support platform 86 by a pair of guide lines 100.

Figure 8:
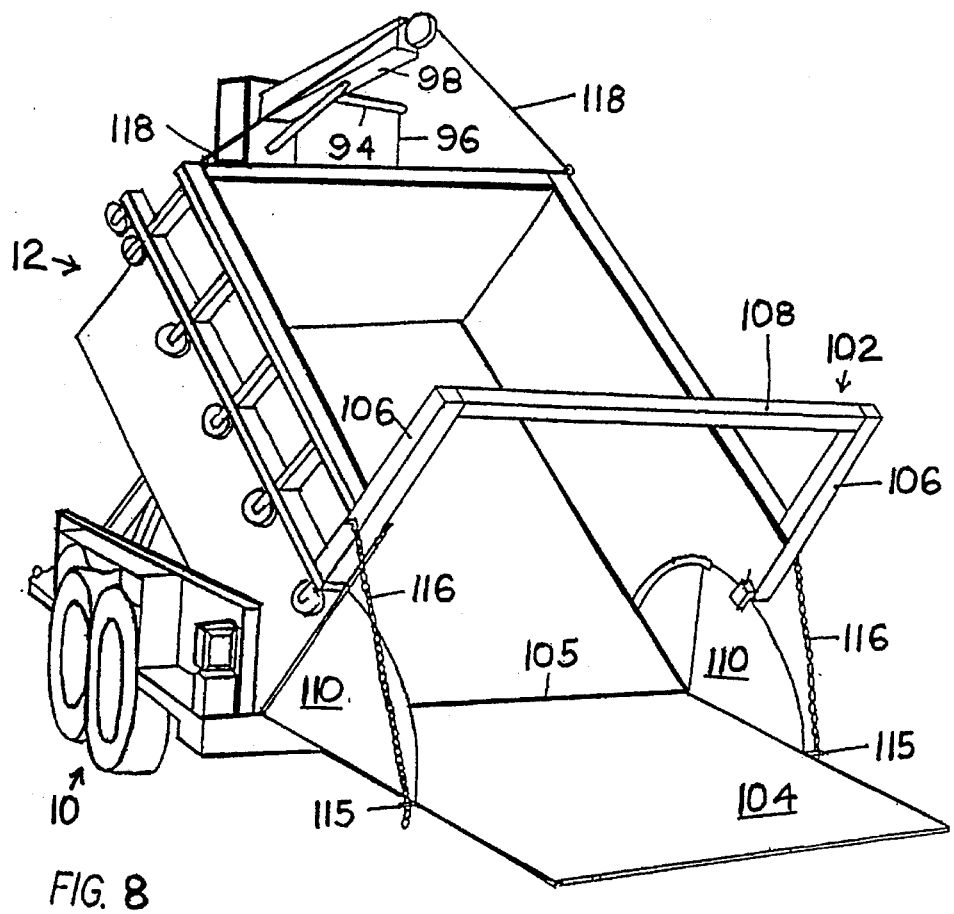
FIG. 8 is rear perspective view of a dump embodiment of the roll on roll off receptacle.

In FIG. 8 a dump embodiment of the roll on roll off receptacle carried by the wheeled vehicle of FIG. 7 is illustrated. The receptacle is shown in the raised position with the door 104 opened such that its upper surface is horizontal. The open end support 102 functions to prevent the upper edges of the side walls of the receptacle from bending outwardly when the receptacle is loaded. It is important that these side walls remain vertical so that they do not bind against the side walls of the wheeled vehicle 10, to insure that the set of aligned rollers 38 are properly aligned with the pair of elongated flat support surfaces 34 of the wheeled device or vehicle 10, and to insure proper operation of door 104. The open end support 102 includes vertical supports 106 that are securely fastened to the rear end of the side walls of the roll on roll of receptacle 12 and extend upwardly of the side wall's upper edges. The upper ends of the vertical supports 106 are interconnected by a horizontal support 108. The door 104 is pivotally connected along a hinge 105 and includes side plates 110 that have arcuate edges and are secured to the door 104 and extend normal thereto. The arcuate side plates 110 telescope with the inner surface of the side walls of the roll on roll off receptacle 12. At the rear edges of the roll on roll off receptacle's side walls there are guides 112 that insure that the arcuate side plates 110 remain closely adjacent the side walls of the roll on roll off receptacle 12. Also mounted on the inner surfaces of the side walls of the roll on roll off receptacle 12 are edge restrainers 114 that also contribute to maintaining the side plates 110 in proper position relative to the side walls of the roll on roll off receptacle 12. A pair of chains 116 are secured at one end to the vertical supports 106 and can be connected to mounting devices 115 on the door 104. The mounting devices 115 permit the chains 116 to be secured to the door 104 at any point along its length. In FIG. 8 the chain is connected to the door 104 at a point along its length that will cause the 104 to be horizontal when the roll on roll off receptacle 12 is raised as illustrated. This arrangement permits loose material such as cut and split fire wood to flow down to the horizontal surface of the door 104 where it is convenient to grasp and stack into wood piles or into a fire wood bailing machine. The open end support 102 is important in insuring the proper operation of the door 104. If the side walls of the roll on roll off receptacle 12 were allowed to bend outwardly then the side plates 110 of the door 104 would bind and become immovable relative to the guide 112 and edge protector 114. Since this receptacle is designed to carry heavy loads, it has a framework in the form of a grid below the bottom surface which adds substantially to the structural integrity of the receptacle.

The boom arm 98 can be extended and retracted and can also pivot about a horizontal pivot axis thus causing its free end to raise and lower. In FIG. 8 the boom arm 98 has been pivoted upwardly about its horizontal axis and has through the guide wires 118 picked up the front end of the roll on roll off receptacle 12 thereby causing it to pivot about a pivotal connection between the roll on roll off receptacle 12 and wheeled device or vehicle 10 (see FIGS. 7 and 9).

Figure 9:
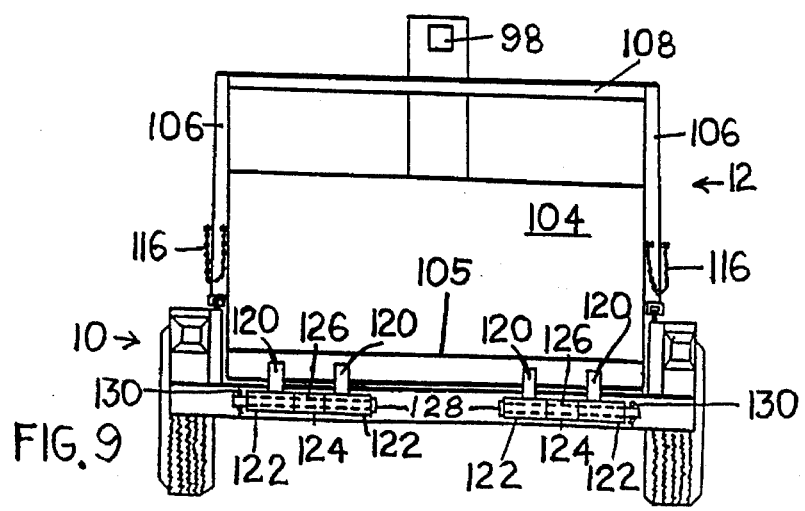
FIG. 9 is a rear view of embodiment shown in FIG. 8 with the roll on roll off receptacle horizontal.

FIG. 9 shows the pivoting mechanism for pivotally connecting the bottom rear edge of the roll on roll off receptacle 12 to the bottom rear edge of the wheeled vehicle 10 of FIG. 8. Two sets of arms 120 extend downwardly from the bottom rear edge of the roll on roll off receptacle 12. A cylindrical member 122 is secured to the free end of each of the arms 120, such that there is a space between the cylindrical members 122 in each set. A cylindrical member 124, corresponding to each set of arms 120, is secured to the bottom rear edge of the wheeled vehicle 10, and is sized and located to fit in the space between the cylindrical members 122. The cylindrical members 122 and 124 have an aligned cylindrical opening 126 bored therethrough that receives pivot pins 128. The pivot pins have toggles 130 to prevent their unintentional removal.

Figure 10:
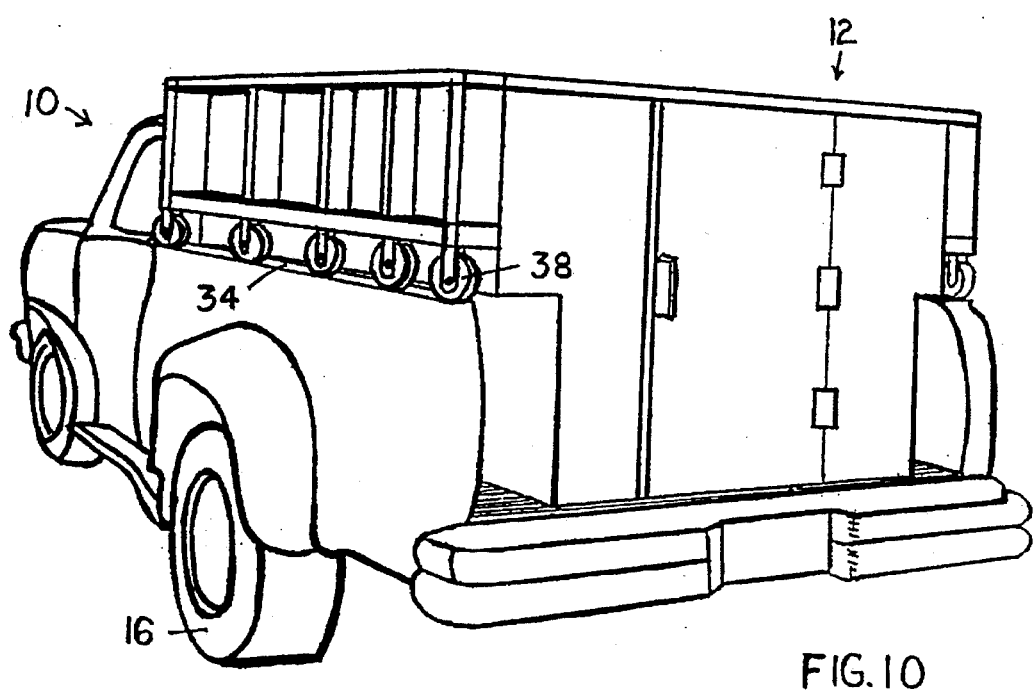
FIG. 10 is a rear perspective view of a roll on roll off receptacle mounted on the bed of a pick up truck.

FIG. 10 shows a pick-up truck 10 having a roll on roll off receptacle 12 mounted thereon. It should be noted that the roll on roll off receptacle 12 used in this embodiment has a transverse cross section in form of an inverted T. The lower portion of this roll on roll off receptacle 12 must be narrower to accommodate the wheel wells for the rear wheels of the pick-up truck 10.

In this embodiment the roll on roll off receptacle 12 can take many forms such as a tool shed, a mobil office, a camper or any of the numerous uses mentioned earlier for roll on roll off receptacle 12. The roll on roll off concept is particularly useful with a pick-up truck which is normally put to many uses where the receptacle is not required. The roll on roll off receptacle 12 can be quickly rolled on to the pick-up truck when it is desired and rolled off for storing on a receptacle storage platform when not required. A manually operated jacking mechanism and a pivot connection between the rear edges of the roll on roll off receptacle 12 and the truck bed of the type shown in FIG. 9, could be provided to thereby add the dumping feature to this embodiment.

Figure 11:
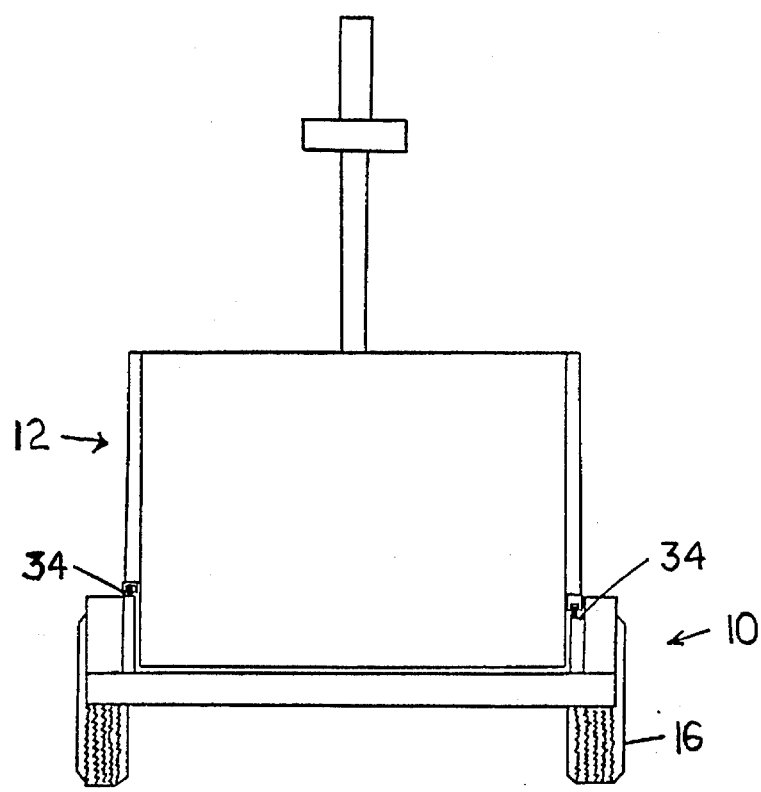
FIG. 11 is a rear view of an embodiment of the invention in which the support surface on one side of the wheeled vehicle is at a higher location than the support surface on the other side of the vehicle.

In FIG. 11 there is an embodiment of the invention illustrated in which the support surface 34 on the right hand side of the vehicle, as seen in this Figure, are at a lower elevation than the support surface 34 on the opposite side of the vehicle. This embodiment allows a greater portion of the right hand side of the receptacle 12 to be utilized as an access opening for loading and unloading the receptacle 12. This Figure is also intended to illustrate that it is not essential that the support surfaces 34 on opposite sides of the wheeled vehicle be at the same elevation.

Figure 12:
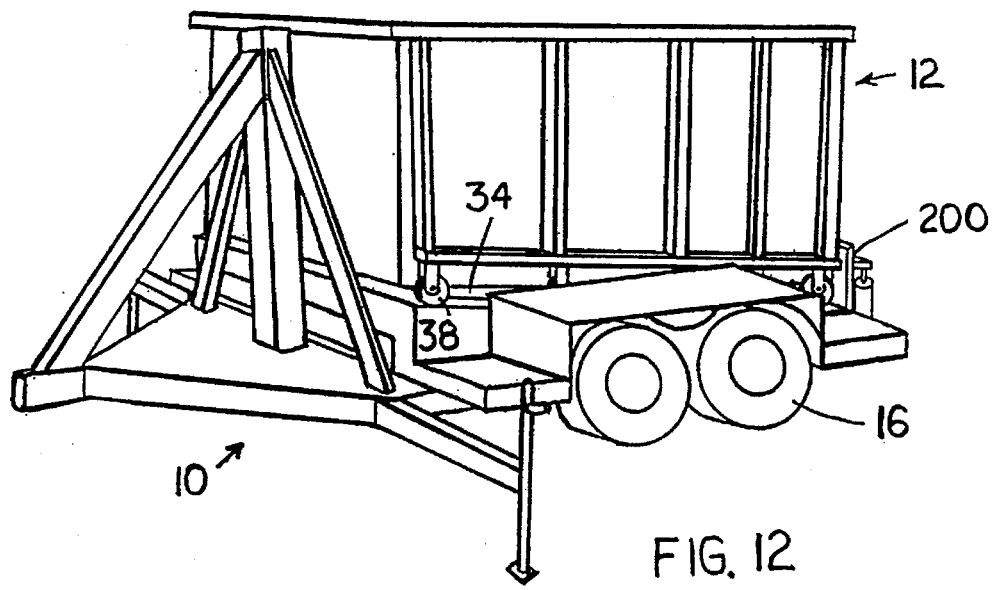
FIG. 12 is a perspective view of an embodiment of the invention in which the support surfaces decline from the front of the wheeled vehicle to its rear.

In FIG. 12 there is another embodiment of the invention illustrated in which the support surfaces 34 decline from the front of the wheeled vehicle 10 toward the rear of the vehicle. In this embodiment releasable restraining means 200 are provided, that when in the active position, prevent the receptacle 12 from rolling down and off the wheeled vehicle 10. The releasable restraining means 200 can be remotely disengaged by the operator, to thereby permit the receptacle 12 to roll down the declined support surfaces 34 under the force of gravity. It should be understood that the receptacle 12 could roll onto a receptacle storage platform 14 of appropriate height or could be discharged to the ground. This embodiment will permit the discharge of a receptacle 12 to the ground while the wheeled vehicle is moving forward.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A transport vehicle, a modular container adapted to contain product to be transported and a support storage platform;

said transport vehicle adapted to receive and unload said modular container from and to said support storage platform;

said modular container having a bottom surface that is adapted to support carried products and a center of gravity, said center of gravity being a given vertical distance above said bottom surface;

said transport vehicle, modular container and support storage platform each having cooperating anti-friction mechanisms, laying in a plane, that will support said modular container on said transport vehicle or support storage platform, with the center of gravity of said container being displaced vertically from said plane while supported by either the transport vehicle or said support storage platform a distance less than said given distance, to thereby provide a stable support for said modular container and to facilitate movement of said modular container to said transport vehicle from said support storage platform and to said support storage platform from said transport vehicle;

and wherein each of said transport vehicle, modular container and support storage platform have a second cooperating anti-friction mechanism that lie in a horizontal plane that is vertically displaced from said plane.

2. The invention as set forth in claim 1 wherein said transport vehicle includes ground engaging wheels and ground engaging jacking mechanisms, said ground engaging jacking mechanisms can function to adjust the height of the transport vehicle relative to the ground and raise the ground engaging wheels off the ground to thus prevent movement of the transport vehicle relative to the ground.

3. The invention as set forth in claim 1 wherein said support platform is adapted to be moved from place to place.

4. The invention as set forth in claim 1 wherein said transport vehicle has an overhead swinging boom mounted thereon and a hoist trolley supported on said overhead swinging boom.

5. A wheeled device in combination with a roll-on roll-off receptacle comprising:

said wheeled device having a receiving end and a closed end and including a frame, a set of ground engaging wheels mounted on said frame for rotation about a generally horizontal axis, said horizontal axis being spaced above the ground a first distance, the wheels of said set of ground engaging wheels being spaced from each other along the generally horizontal axis such that there is a space therebetween that is equal to a second distance, a pair of elongated flat support surfaces mounted on said frame such that they are horizontal to the ground and unencumbered from above by wheeled device structure, said pair of elongated flat support surfaces being spaced from each other and at a level above the ground a distance in excess of said first distance, an anchoring device on said wheeled device for releasably securing said roll on roll off receptacle to said wheeled device, an overhead swinging boom mounted on said frame, adjacent said closed end of said wheeled device, and a hoist trolley supported on said overhead swinging boom, said a roll-on roll-off receptacle including a substantially horizontal bottom support surface that is adapted to support carried products and two sets of rollers secured to said a receptacle, each set of rollers including a plurality of aligned rollers that rest on said a pair of elongated flat support surfaces, said two sets of rollers being secured to said a roll-on roll-off receptacle such that when said sets of rollers support said a roll-on roll-off receptacle on said wheeled device said substantially horizontal bottom support surface is at a level below said pair of elongated flat support surfaces, an anchoring device on said roll-on roll-off receptacle that cooperates with said anchoring device on said wheeled device to secure the roll-on roll-off receptacle on said wheeled device.

6. The invention as set forth in claim 5 wherein said swinging boom includes a vertical pedestal secured to said frame adjacent to said closed end of the wheeled device and a horizontal beam pivotally mounted at the upper end of said vertical pedestal about a vertical pivot axis.

7. The invention as set forth in claim 6 wherein said hoist trolley is mounted on said swinging boom such that it can traverse along the length of the horizontal beam and raise and lower objects that have been connected thereto.

8. The invention as set forth in claim 7 wherein said anchoring device on said wheeled device is adjacent said closed end of the wheeled device.

9. A wheeled device in combination with a roll-on roll-off receptacle comprising:

said wheeled device including a frame, a set of ground engaging wheels mounted on said frame for rotation about a generally horizontal axis, said horizontal axis being spaced above the ground a first distance, the wheels of said set of ground engaging wheels being spaced from each other along the generally horizontal axis such that there is a space therebetween that is equal to a second distance, a pair of elongated flat support surfaces mounted on said frame such that they are horizontal to the ground and unencumbered from above by wheeled device structure, said pair of elongated flat support surfaces being spaced from each other and at a level above the ground a distance in excess of said first distance, an anchoring device on said wheeled device for releasably securing said roll on roll off receptacle to said wheeled device, said a roll-on roll-off receptacle including a substantially horizontal bottom support surface that is adapted to support carried products and two sets of rollers secured to said a receptacle, each set of rollers including a plurality of aligned rollers that rest on said a pair of elongated flat support surfaces, said two sets of rollers being secured to said a roll-on roll-off receptacle such that when said sets of rollers support said a roll-on roll-off receptacle on said wheeled device said substantially horizontal bottom support surface is at a level below said pair of elongated flat support surfaces, an anchoring device on said roll-on roll-off receptacle that cooperates with said anchoring device on said wheeled device to secure the roll-on roll-off receptacle on said wheeled device, a receptacle storage platform, said receptacle storage platform including a frame and means for moving said receptacle storage platform from place to place, a pair of elongated flat support surfaces mounted on the frame of said receptacle storage platform such that they are horizontal to the ground and spaced from each other a distance equal to the distance between the pair of elongated flat support surfaces of said wheeled device, said receptacle storage platform being elevatable such that its elongated flat support surfaces can be vertically aligned with said pair of elongated flat support surfaces of said wheeled device, said receptcle storage platform has a roll on roll off receptacle receiving end and an opposite closed end, said pair of elongated flat support surfaces of said receptacle storage platform extending from said roll on roll off receptacle receiving end to said opposite closed end, stop receptacles on said pair of elongated flat support surfaces of said receptacle storage platform at the roll on roll off receptacle receiving ends thereof, stops adapted to be received by said stop receptacles after a roll on roll off receptacle has been rolled onto said receptacle storage platform pair of elongated flat support surfaces to thereby prevent the inadvertent rolling off of the roll on roll off receptacle from the pair of elongated flat support surfaces.

10. A wheeled device in combination with a roll-on roll-off receptacle comprising:

said wheeled device having a receiving end and a closed end and including:

a flame;

a set of ground engaging wheels mounted on said frame for rotation about a generally horizontal axis, said horizontal axis being spaced above the ground a first distance, the wheels of said set of ground engaging wheels being spaced from each other along the generally horizontal axis such that there is a space therebetween that is equal to a second distance;

a pair of elongated flat support surfaces mounted on said frame such that they are horizontal to the ground and unencumbered from above by wheeled device structure, said pair of elongated flat support surfaces being spaced from each other and at a level above the ground a distance in excess of said first distance;

an overhead swinging boom mounted on said frame, adjacent said closed end of said wheeled device, and a hoist trolley supported on said overhead swinging boom;

said a roll-on roll-off receptacle including:

a substantially horizontal bottom support surface that is adapted to support carried products;

two sets of rollers secured to said a receptacle, each set of rollers including a plurality of aligned rollers that rest on one of said elongated flat support surfaces of said a pair of elongated flat support surfaces, said two sets of rollers being secured to said a roll-on roll-off receptacle such that when said sets of rollers support said a roll-on roll-off receptacle on said wheeled device said substantially horizontal bottom support surface of said a roll-on roll-off receptacle is at a level below said pair of elongated flat support surfaces.

11. A wheeled device in combination with a roll-on roll-off receptacle and a receptacle storage platform comprising:

said wheeled device including:
  a frame;
  a set of ground engaging wheels mounted on said frame for rotation about a generally horizontal axis, said horizontal axis being spaced above the ground a first distance, the wheels of said set of ground engaging wheels being spaced from each other along the generally horizontal axis such that there is a space therebetween that is equal to a second distance;
  a pair of elongated flat support surfaces mounted on said frame such that they are horizontal to the ground and unencumbered from above by wheeled device structure, said pair of elongated flat support surfaces being spaced from each other and at a level above the ground a distance in excess of said first distance;
said a roll-on roll-off receptacle including:
  a substantiality horizontal bottom support surface that is adapted to support carried products;
  two sets of rollers secured to said a receptacle, each set of rollers including a plurality of aligned rollers that rest on one of said elonqated flat support surfaces of said a pair of elongated flat support surfaces, said two sets of rollers being secured to said a roll-on roll-off receptacle such that when said sets of rollers support said a roll-on roll-off receptacle on said wheeled device said substantially horizontal bottom support surface of said a roll-on roll-off receptacle is at a level below said pair of elongated flat support surfaces;
said receptacle storage platform including:

a frame;
means for moving said receptacle storage platform from place to place;
a pair of elongated flat support surfaces mounted on the frame of said receptacle storage platform such that they are horizontal to the qround and spaced from each other a distance equal to the distance between the pair of elongated flat support surfaces of said wheeled device;
said receptacle storage platform being elevatable such that its elongated flat support surfaces can be vertically aligned with said pair of elongated flat support surfaces of said wheeled device;
said receptacle storage platform has a roll on roll off receptacle receiving end and an opposite closed end, said pair of elongated flat support surfaces of said receptacle storage platform extending from said roll on roll off receptacle receiving end to said opposite closed end, stop receptacles on said pair of elongated flat support surfaces of said receptacle storage platform at the roll on roll off receptacle receiving ends thereof, stops adapted to be received by said stop receptacles after a roll on roll off receptacle has been rolled onto said receptacle storage support surfaces, to thereby prevent the inadvertent rolling off of the roll on roll off receptacle from the receptacle storage platform elongated flat support surfaces.

* * * * *

UNITED STATES PATENT AND TRADEMARK OFFICE
CERTIFICATE OF CORRECTION

PATENT NO. : 5,490,753
DATED : February 13, 1996
INVENTOR(S) : Richard Green

It is certified that error appears in the above-indentified patent and that said Letters Patent is hereby corrected as shown below:

In The Claims

In Claim 9, line 17, delete "anchorinq" and substitute --anchoring--.

In Claim 9, line 44, delete "elonqated" and substitute --elongated--.

In Claim 9, line 47, delete "receptcle" and substitute --receptacle--.

In Claim 10, line 5, delete "flame" and substitute --frame--.

In Claim 11, line 24, delete "elonqated" and substitute --elongated--.

In Claim 11, line 25, delete "elongated" and substitute --elongated--.

In Claim 11, line 39, delete "qround" and substitute --ground--.

UNITED STATES PATENT AND TRADEMARK OFFICE
CERTIFICATE OF CORRECTION

PATENT NO. : 5,490,753
DATED : February 13, 1996
INVENTOR(S) : Richard Green

It is certified that error appears in the above-indentified patent and that said Letters Patent is hereby corrected as shown below:

In Claim 11, line 57, delete ",".

Signed and Sealed this

Second Day of September, 1997

*Attest:*

BRUCE LEHMAN

*Attesting Officer*　　　Commissioner of Patents and Trademarks